United States Patent Office 3,391,123
Patented July 2, 1968

3,391,123
PROCESS FOR MELT SPINNING FIBERS
Harvey Steadly, Westport, Conn., assignor to E. I. du Pont de Nemours and Company, Wilmington, Del., a corporation of Delaware
No Drawing. Continuation-in-part of application Ser. No. 133,546, Aug. 24, 1961. This application Mar. 16, 1965, Ser. No. 440,309
10 Claims. (Cl. 260—75)

ABSTRACT OF THE DISCLOSURE

A process is disclosed for preparing and melt spinning polyethylene terephthalate into textile fibers which provide fabrics having improved resistance to pilling. Anhydrous polyester modified with an oxyboron compound is prepared to have a melt viscosity at 275° C. of about 1000 to 6000 poises, is melt spun to form fibers, and the fibers are exposed to moisture. Fibers are readily prepared in this way which have a relative viscosity of 10 to 17 needed to improve the pill resistance of fabrics. This is in contrast to unmodified polyester of the same relative viscosity which has such a low melt viscosity during melt spinning, in the range of 500 to 1000 poises, that it is quite difficult to maintain satisfactory product uniformity and freedom from filament discontinuities.

CROSS-REFERENCES TO RELATED APPLICATIONS

This is a continuation-in-part of my copending application Ser. No. 133,546, which was filed Aug. 24, 1961 (now abandoned), as a continuation-in-part of my application Ser. No. 784,058, filed Dec. 31, 1958 (now abandoned).

This invention relates to production of melt-spun fibers of ethylene terephthalate polyester. More particularly, it relates to an improved process in which a modified polyethylene terephthalate is used which can be readily melt spun to produce low molecular weight textile fibers, especially pill-resistant staple fibers.

Polyethylene terephthalate, the preparation of which is described by Whinfield and Dickson in their U.S. Patent No. 2,465,319, has attracted high commercial interest for many uses owing to its high tenacity, flexibility, crease resistance, low moisture absorption, and other valuable properties. Fabrics prepared from fibers of polyethylene terephthalate have become well known for their ease-of-care properties associated with fast drying, crease recovery, and wrinkle resistance as well as for their strength and abrasion resistance. However, the use of polyethylene terephthalate staple fibers for certain end uses has been greatly restricted by a phenomenon known as "pilling," which refers to the accumulation of the surface of a fabric of numerous unsightly small balls of fiber, sometimes with the inclusion of foreign materials. Although attempts have been made to eliminate the phenomenon of pilling by various fabric treatments, such attempts have met with only limited success. Solutions which have been suggested include, for example, special fabric treatment combinations of brushing, shearing, and singeing to remove loose fiber ends from the fabric surface.

Many attempts have also been made to modify the polyethylene terephthalate fiber itself in order to inhibit the tendency towards pilling in staple fabrics. It was early recognized that the unsightly effect of pilling was not due so much to the formation of pills, which occurs in all fabrics prepared from staple fibers, but to the difficulty in wearing off the pills once formed, since the high strength and abrasion resistance of polyethylene terephthalate prevents their rapid removal during normal use of the fabrics. One of the best solutions of the problem found up to the present time has been to prepare the fibers from polymer of relatively low molecular weight, characterized by sharply reduced viscosity values, as more fully defined below. In general, fibers of polyethylene terephthalate and its copolyesters exhibit little or no pilling when prepared from polymers having a relative viscosity of about 12, while at a relative viscosity of about 20 the pilling problem is already quite severe. A practical lower limit on the relative viscosity of the polymer is imposed by the need for adequate yarn physical properties such as abrasion resistance, which is poor at low relative viscosities, especially below 10. In the case of homopolymer, a relative viscosity range of about 13 or 14 to about 17 appears to be optimum for providing fibers having good physical properties while at the same time exhibiting relative freedom from pilling. The same limits, or slightly different limits in the same general range, apply for the various synthetic linear copolyesters comprised predominately of ethylene terephthalate structural units.

In contrast to the low level of polymer relative viscosity which has been found desirable for producing yarn exhibiting freedom from pilling, the usual commercial practice has been to spin polyethylene terephthalate and its copolyesters at relative viscosities in the range of 25 to 30. Unfortunately, in attempting to reduce the relative viscosity of the spun polyethylene terephthalate, it has been found that the difficulty in spinning the polymer rapidly increases as the relative viscosity is reduced below the level of about 20. This is apparently due to the lowering of the melt viscosity of the polymer as the level of relative viscosity is reduced. For example, at a relative viscosity level of about 26 and a temperature of 275° C., polyethylene terephthalate exhibits a melt viscosity of 3000 poises, while the melt viscosity drops to less than 1000 at a relative viscosity of 15. The chief problems encountered when the melt viscosity is low are maintenance of the uniformity of product and continuity of spinning of the molten filaments without the formation of "drips." Thus, the problem is to extrude polyethylene terephthalate fibers at the highest practicable melt viscosity within the range of about 1000 to 6000 poises and yet produce fibers having a relative viscosity of approximately 10 to 17, although such fibers normally have a melt viscosity in the range of only about 500 to 1000 poises.

It is an object of this invention to provide a process for producing and melt-spinning a novel polyethylene terephthalate composition which exhibits high melt viscosity during spinning but low levels of viscosity after spinning. Another object is to provide such a process for producing highly-uniform polyethylene terephthalate fibers from which may be prepared fabrics which are substantially free from pilling. These and other objects will be apparent from the following description and claims.

The present invention is a process for producing textile fibers of sufficiently low molecular weight polyester to provide resistance to pilling, which comprises forming an anhydrous melt of ethylene terephthalate polyester modified with an oxyboron compound to incorporate in the recurring ethylene terephthalate structural units from 0.5 to 2 mol percent, based on the ethylene terephthalate units, of recurring mid-chain hydrocarbyloxyboron structural units containing at least one boron atom directly linked to an oxygen atom, said anhydrous melt having a melt viscosity at 275° C. in the range of about 1000 to about 6000 poises; maintaining the polyester anhydrous and melt-spinning the polyester into fibers; and exposing the spun fiber to moisture to hydrolyze said polyester between the boron and oxygen atom. Preferably, the fibers are melt-spun from an oxyboron-modified polyester anhydrous melt having a melt viscosity at 275° C. of at least 1500 poises. After the fibers of oxyboron-modified polyester have been exposed to moisture, the fibers so prepared are characterized by sharply reduced molecular weights, as measured by viscosity determinations carried out on the fibers, particularly when compared with corresponding polyester fibers of ethylene terephthalate structural units containing no boron but spun at the same melt viscosity.

By spinning at melt viscosity levels of 1000 to 6000 poises (preferably 1500 to 6000 poises) in accordance with the invention, uniformity of spinning is greatly facilitated as contrasted to spinning at lower levels of melt viscosity. The fibers so produced are uniform and of high quality. However, it has been found that the fibers are composed of much lower molecular weight polyester than would be expected from the viscosity of the anhydrous melt, and exhibit much greater freedom from pilling in fabric form than fibers of polyesters containing no boron and spun at the same melt viscosity. Apparently even the normal exposure of fibers to atmospheric humidity which occurs in fiber-manufacturing operations causes hydrolysis of oxyboron linkages in the structural chain of the polyester to reduce the molecular weight of oxyboron-modified polyester fibers.

As discussed below, the anhydrous polyester melt may be formed by mixing an oxyboron compound of the class hereinafter defined with polyethylene terephthalate after the polymerization step has been completed. Surprisingly, the anhydrous melt of oxyboron-modified polyester can be prepared by copolycondensation despite the volatility of hydrocarbyloxyboron compounds formed in the molten ethylene terephthalate environment.

MIXING OXYBORON COMPOUND WITH POLYETHYLENE TEREPHTHALATE AFTER COMPLETION OF POLYMERIZATION

In one aspect of the invention, polyethylene terephthalate having a melt viscosity at 275° C. in the range of about 1000 to about 6000 poises is prepared by melt polymerization and an oxyboron compound (e.g., boric acid) is added to the polyester at the end of the polymerization reaction in the proportion of about 0.5 to about 2 gram atoms of boron in the added compound per 100 gram mols of ethylene terephthalate recurring structural units in the polyester. Relatively little change in the melt viscosity occurs upon addition of the oxyboron compound. The melt is anhydrous owing to its high temperature (about 275° C.). After the oxyboron compound is added, the polyester is maintained anhydrous by keeping it molten prior to spinning; or, if it is desired to solidify and remelt the polyester, extreme care is used to maintain the polyester anhydrous by exclusion of all moisture, even moist air. The polyester is then melt spun to form fibers. After the fibers are formed, they are exposed to moisture. This is accomplished by contacting the fibers with an aqueous textile finish or other aqueous processing liquid; or simply by exposing the fibers to moist air for a day or so. The fibers so prepared are characterized by sharply reduced viscosity values, as compared with conventional polyethylene terephthalate fibers spun at the same melt viscosity.

Typical boron-containing compounds which may be added to the polyester include boric acid, boric oxide, sodium borate, methyl metaborate, tributyl borate, benzeneboronic acid, and p-carbethoxybenzeneboronic acid. Upon contacting the melt, the oxyboron compound reacts with the polyester and becomes incorporated in the polyester as a recurring mid-chain hydrocarbyloxyboron structural unit containing from one to three direct boron-oxygen linkages. It is these linkages which are hydrolyzed when the polyester later contacts moisture.

In a preferred embodiment of this aspect of the invention, the oxyboron compound is added and mixed with the polyester melt immediately prior to spinning, i.e., with a holdup time in the melt of no more than a few minutes. The polymerization is carried out at very low pressure and the addition of the oxyboron compound is preferably made when the polymerization reaction is terminated by increasing the pressure; otherwise, serious losses of oxyboron compounds through volatilization may occur. If desired, the polyester may be solidified after it is formed, mixed with the oxyboron compound, remelted with mixing, and spun; care should be taken that the mixture to be remelted is anhydrous to prevent degradation during melting. As previously indicated, once the anhydrous melt is formed from the polyester and the oxyboron compound, it is essential to maintain the composition anhydrous prior to spinning.

This aspect of the invention may be more specifically defined as an improvement in the process of melt-spinning a polyester compound essentially of ethylene terephthalate recurring structural units and having a melt viscosity at 275° C. of about 1000 to about 6000 poises which comprises mixing with the molten polyester an oxyboron compound in the proportion of about 0.5 to about 2 gram atoms of boron in the added compound per 100 gram mols of ethylene terephthalate recurring structural units in the polyester to form an anhydrous melt having a melt viscosity of about 1000 to about 6000 poises at 275° C.; said oxyboron compound being selected from the class consisting of boric oxide, boric acid, hydrocarbylboronic acids, hydroxyhydrocarbylboronic acids, carboxyhydrocarbylboronic acids, hydroxyhydrocarbylborinic acids, carboxyhydrocarbylborinic acids, hydrocarbyl and oxyhydrocarbyl esters of said acids, and metallic salts of said acids soluble in said polyester at 275° C.; maintaining said polyester melt anhydrous and melt-spinning it to form fibers; and finally exposing the spun fibers to moisture.

POLYETHYLENE TEREPHTHALATE PREPARATION WITH COPOLYCONDENSATION OF OXYBORON COMPOUNDS

In a second aspect of the invention, an ester of terephthalic acid and ethylene glycol is melt polymerized to form a polyester composed essentially of ethylene terephthalate recurring structural units in the presence of a condensation catalyst and an oxyboron compound (e.g., boric acid) in the initial proportion of about 3 to about 20 gram atoms of boron in the oxyboron compound per 100 gram mols of ethylene terephthalate recurring structural units in the polyester. The polycondensation reaction is carried out at elevated temperature and reduced pressure, the final temperature being about 250° to about 300° C. and the final pressure being less than about 10 mm. of mercury. When a melt viscosity in the range of 1000 to 6000 poises at 275° C. is attained, the polymerization is stopped, e.g., by increasing the pressure. At the conclusion of polymerization the polyester is in the form of an anhydrous melt, and it is essential to maintain the polyester anhydrous prior to spinning. After the fibers are formed, they are exposed to moisture, either by contacting them with an aqueous liquid or simply by exposing them to moist air for a day or so. The fibers so prepared are characterized by sharply reduced relative viscosity values, as compared with conventional polyethylene terephthalate fibers spun at the same melt viscosity.

Surprisingly, when an ethylene glycol ester of terephthalic acid is melt polymerized in the presence of only about 0.5 gram atom of boron or even 1.5 gram atoms of boron in the oxyboron compound per 100 gram mols of ethylene terephthalate, there is relatively little enhancement of melt viscosity in the resulting polymer, even if the polymerization reaction is allowed to proceed for a considerable time before the oxyboron compound is added. In accordance with the present invention, however, it has been discovered that high melt viscosity polyethylene terephthalate is produced when an ethylene glycol ester of terephthalic acid is polymerized in the presence of a catalyst and at least about 3 gram atoms of boron in the oxyboron compound per 100 gram mols of ethylene terephthalate. During the course of the polymerization reaction, most of the original boron content of the reaction mixture is evolved as volatile boron compounds. However, when the boron content of the initial reaction mixture is at least 3 gram atoms of boron per 100 gram mols of ethylene terephthalate, a product containing at least about 0.5 gram atom of boron per 100 gram mols of ethylene terephthalate is achieved. For higher levels of boron in the polymer to be spun, greater amounts of the oxyboron compound are added to the initial reaction mixture. Levels of up to about 2 gram atoms of boron per 100 gram mols of ethylene terephthalate are readily achieved. Preferably, the amount added does not exceed about 20 gram atoms of boron in the initially added oxyboron compound per 100 gram mols of ethylene terephthalate.

The oxyboron compounds which may be added in the polymerization reaction include not only boric acid, but any of the oxyboron compounds comprehended in the preceding section relating to addition of the oxyboron compounds to polyethylene terephthalate after the conclusion of the polymerization reaction.

Accordingly, this aspect of the invention is more specifically defined as the improvement, in the process for producing textile fibers of a polyester composed essentially of ethylene terephthalate recurring structural units, which comprises melt polymerizing an ester of terephthalic acid and ethylene glycol in the presence of a condensation catalyst and an oxyboron compound, the final temperature employed in the polymerization being about 250° to about 300° C., and the final pressure being less than about 10 mm. of mercury, to form an anhydrous melt of ethylene terephthalate polyester modified with the oxyboron compound and having a melt viscosity of 275° C. of about 1000 to about 6000 poises; said oxyboron compound being added in the proportion of about 3 to about 20 gram atoms of boron in the added compound per 100 gram mols of ethylene terephthalate recurring structural units in the polyester and being selected from the class consisting of boric oxide, boric acid, hydrocarbylboronic acids, hydroxyhydrocarbylboronic acids, carboxyhydrocarbylboronic acids, hydroxyhydrocarbylborinic acids, carboxyhydrocarbylborinic acids, hydrocarbyl and oxyhydrocarbyl esters of said acids, and metallic salts of said acids soluble in said polyester at 275° C.; maintaining said polyester anhydrous and melt-spinning it to form fibers; and finally exposing the spun fibers to moisture.

FORMULAS AND DEFINITIONS

Examples of oxyboron compounds which may be employed in accordance with the present invention, by addition to polyethylene terephthalate either at the conclusion of the polymerization reaction or as a component in the melt polymerization reaction as defined in the two preceding sections, include:

(a) boric oxide,
(b) boric acid,
(c) hydrocarbylboronic acids such as benzeneboronic acid, methylboronic acid, and butylboronic acid,
(d) hydroxyhydrocarbylboronic acids such as hydroxyethylboronic acid and 4-(2-hydroxyethoxy)benzeneboronic acid,
(e) carboxyhydrocarbylboronic acids such as 4-carboxybenzeneboronic acid,
(f) hydroxyhydrocarbylborinic acids such as benzene-4-(2-hydroxyethyl)benzeneborinic acid,
(g) carboxyhydrocarbylborinic acids such as bis-4-carboxybenzeneborinic acid and benzene-4-carboxybenzeneborinic acid,
(h) hydrocarbyl and oxyhydrocarbyl esters of the acids of items (b) through (g) above, such as glycol borate, glycol metaborate, triethyl borate, tributyl borate, triphenyl borate, methyl metaborate, methyl polyborate, benzenedimethoxyborane (dimethyl benzeneboronate), benzenediethoxyborane, diethyl 4-carbethoxybenzeneboronate, 4-carbethoxybenzeneboronic acid, 4-(2-hydroxyethoxy)phenyl-bis-(2-hydroxyethoxy)borane, dimethoxymethylborane, dibutoxybutylborane, bis-(dimethoxyboryl)ethane, and ethoxy-bis-(4-carbethoxyphenyl)borane, and
(i) metallic salts of the acids of items (b) through (g) above, such as sodium borate, sodium tetraborate, and sodium benzeneboronate.

As used herein, hydrocarbyl radicals refer to radicals derived from hydrocarbons. While there is no critical upper limit to the size of the hydrocarbyl radicals in the oxyboron compounds designated above, the hydrocarbyl radicals generally do not contain more than about 20 carbon atoms and are free of aliphatic unsaturation. The hydrocarbyl radicals thus comprehend both alkyl (including cycloalkyl and aryl (including aralkyl) radicals containing up to about 20 carbon atoms. Similarly, oxyhydrocarbyl radicals are hydrocarbyl radicals containing oxy (—O—) groups. Carboxyhydrocarbyl and hydroxyhydrocarbyl radicals are correspondingly hydrocarbyl radicals containing carboxy or hydroxy groups which may also contain other oxy groups.

Whether added after completion of the polymerization reaction or copolymerized with the initial ingredients, the oxyboron compound forms a recurring mid-chain hydrocarbyloxyboron structural unit of carbon, hydrogen, oxygen, and boron containing at least one boron atom directly linked to an oxygen atom. In the case of an oxyboron compound such as benzeneboronic acid both chain-extending linkages are boron-to-oxygen, while in the case of boric acid there are three such linkages with an ethylene terephthalate side chain; however, gelation does not occur and the polyester in fiber form after hydrolysis of the boron-to-oxygen linkages is linear.

The oxyboron compounds which may be employed in accordance with the present invention may be defined alternatively as soluble boron-containing compounds of the formulas (I) $$Y'_j BY_{3-j-k}(OX)_k$$

and (II) $$X_{m-1} B_p O_q$$

where Y is a monovalent hydrocarbyl or oxyhydrocarbyl radical; Y' is a hydroxyhydrocarbyl or carboxyhydrocarbyl radical; X is hydrogen, hydrocarbyl, oxyhydrocarbyl, or the fraction of a metal equal to the reciprocal of its valence, $n$; $k$ is 1 or 2, $j$ is a number in the range zero to 2, and $j$ plus $k$ is 2 or 3; and $m$, $n$, $p$, and $q$ are small positive integers satisfying the relationship $$m = \frac{2q-3p}{n}+1$$

Examples of oxyboron compounds comprehended by Formula I therefore include benzeneboronic acid, sodium benzeneboronate, benzenedimethoxyborane (dimethyl benzeneboronate), benzenediethoxyborane, 4-carbethoxybenzeneboronic acid, diethyl 4-carbethoxybenzeneboronate, 4-(2-hydroxy-ethoxy)phenyl-bis-(2-hydroxyethoxy)borane, methylboronic acid, dimethoxymethylborane, butylboronic acid, dibutoxybutylborane, bis-(dimethoxyboryl)ethane, ethoxy-bis-(4-carbethoxyphenyl)borane, bis-4-carboxybenzeneborinic acid, and benzene-p-carboxybenzeneborinic acid.

Examples of oxyboron compounds comprehended by Formula II include boric acid; boric oxide; glycol borate, $B(OCH_2CH_2OH)_3$; glycol metaborate, $$(OBOCH_2CH_2OH)_3$$

triethylborate, $B(OCH_2CH_3)_3$; triphenyl borate, $$B(OC_6H_5)_3$$

methyl metaborate, $(OBOCH_3)_3$; methyl polyborate, $[(CH_3O)_3B]_2(B_2O_3)_3$. Sodium tetraborate, $Na_2B_4O_7$ is a typical example of a soluble borate wherein X is a metal. The degree of hydration of the borate is not critical. If desired, mixtures of borates or the equivalent mixed borate salts may be employed. The organic portion of the borates is not particularly critical although, e.g., hydrocarbon or glycol borates are preferred. In addition, other materials such as delusterants and the like may be added to the reaction mixture.

In some instances, the desired boron-containing compound may be formed conveniently in situ. For example, phenyl-bis-(2-hydroxyethoxy)borane may be formed by reacting phenylboron dichloride with the glycol to be used in forming the polyester.

If the modified polyester is prepared in an autoclave and the molten polyester is quenched with water in the usual manner prior to flake preparation, the polyester does not possess enhanced melt viscosity with relation to its relative viscosity when it is remelted for spinning. In fact, the enhanced melt viscosity is not even maintained if the polymer is merely exposed to the water vapor existing in ordinary room air. Drying the polyester by normal methods, once it is exposed to water, does not restore the enhanced melt viscosity. Surprisingly, however, if the modified polyester is maintained under dry conditions in accordance with the invention, the enhanced melt viscosity can be utilized to its full effect in the spinning operation. A convenient method of maintaining the modified polyester dry prior to spinning is to maintain it in the molten condition between the addition of the boron-containing material and its extrusion into filaments. Subsequent to the extrusion of the filaments from the spinneret the filaments are processed in the normal manner without maintenance of anhydrous conditions.

It has also been found, however, that if a modified polymer is prepared in accordance with the invention and is then contacted with moisture, the property of enhanced melt viscosity with respect to relative viscosity can be restored by subjecting the polymer to further polycondensation; providing that the boron-containing materials are not leached out of the polymer in the interim. In this instance, the preparation of the polymer can be regarded as a special case of adding the boron-containing compound during the polymerization of the polymer.

The addition of the boron-containing compound in accordance with the invention is applicable not only to polyethylene terephthalate homopolymer, but also to its copolyesters, i.e., synthetic linear glycol-dicarboxylate polyesters wherein at least about 75% of the recurring structural units of the polyester are ethylene terephthalate structural units. The polyester or copolyester should be fiber forming and have a relative viscosity of at least about 12. The copolyester may be represented in a more general way by the formula

where —G— and —A— are divalent organic radicals corresponding, respectively, to the radicals in the initial glycol, $G(OH)_2$, and in the initial dicarboxylic acid, $A(COOH)_2$, and $y$ is a number sufficient that the polymer is of fiber-forming molecular weight; at least about 75% of the —G— radicals being ethylene radicals and at least about 75% of the —OOC—A—COO— radicals being terephthalate radicals. The terephthalate radical may be the sole dicarboxylate constituent of the recurring structural units, or up to about 25% of the recurring structural units may contain other dicarboxylic radicals, such as the adipate, sebacate, isophthalate, 5-(sodium sulfo) isophthalate, bibenzoate, hexahydroterephthalate, diphenoxyethane - 4,4' - dicarboxylate, or p,p'-sulfonylbibenzoate radicals, derived from the corresponding dicarboxylic acids or ester-forming derivatives thereof. Similarly, ethylene glycol may be the sole glycol constituent of the polyester, or up to about 25 mol percent of another glycol may be used, such as tetramethylene glycol, hexamethylene glycol, decamethylene glycol, 2,2-dimethylpropanediol, cis- or trans-p-hexahydroxylylene glycol, diethylene glycol, bis-p-(β-hydroxyethoxy) benzene, bis-1,4-(β-hydroxyethoxy)-2,5-dichlorobenzene, or bis-[p-(β-hydroxyethoxy)phenyl]difluoromethane. In determining the amount of oxyboron compound added to a copolyester, the number of mols of ethylene terephthalate and the number of mols of glycol dicarboxylate other than ethylene terephthalate should first be totaled, and this total should be used as the value for "ethylene terephthalate" in calculating the number of gram atoms of boron in the added oxyboron compound per 100 gram mols of ethylene terephthalate.

Surprisingly, although it has been known previously that various borates in quantities up to about 0.5 mol percent exert a catalytic effect upon the polymerization of bis2-hydroxyethyl terephthalate, the catalytic effect disappears at higher concentrations, especially at concentrations approaching 3 mol percent. Actually, it is found that at this level of concentration the borates exhibit a moderate retarding effect on polymerization. Accordingly, despite the presence of the boron compound additives, it is essential that the usual polycondensation catalyst be added to the reaction mixture. One of the standard polymerization catalysts, such as antimony trioxide or tetraisopropyl titanate, is quite suitable for this purpose.

When the boron compound is mixed with polyethylene terephthalate after polymerization has been finished, it is noted that relative viscosity of the polyethylene terephthalate drops substantially. In order to produce polymer having a given relative viscosity, it is therefore necessary to take the relative viscosity drop into account. However, the melt viscosity of the polymer remains high in relation to the relative viscosity level of the polymer. In order to prevent gradual loss of the boron through evolution of volatile compounds, it is desirable not to hold the mixture at elevated temperatures and reduced pressure for more than a few minutes, i.e., usually for no more than about 15 minutes.

The amount of boron-containing compound added to the starting material (ester of ethylene glycol and terephthalic acid) will generally be within the range of about 3 to 20 gram atoms of boron per 100 gram mols of ethylene terephthalate, especially in the case of compounds having the formula $X_{m-1}B_pO_q$ as defined above. Above about 20 gram atoms of boron per 100 gram mols of ethylene terephthalate the rate of polymerization becomes exceedingly slow despite the presence of catalysts; and, as already indicated, little effect on the melt viscosity is achieved with amounts of boron-containing compound substantially less than 3 gram atoms of boron per 100 gram mols of ethylene terephthalate. The amount of boron in the product increases with increasing amounts of boron-containing compound in the starting material, although the proportion of boron lost through volatilization increases slightly with increasing amounts added to the starting material.

The term "relative viscosity" refers to the ratio of the viscosity of a 10% solution of the polyester, e.g., polyethylene terephthalate or a copolyester thereof in a mixture of 10 parts of phenol and 7 parts of 2,4,6-trichlorophenol by weight to the viscosity of the phenol-trichlorophenol mixture per se, measured in the same units at 25° C. The term "melt viscosity" refers to the absolute value of the viscosity, expressed in poises, of the polymer at the given temperature. The number of gram atoms of boron in the added oxyboron compound per 100 gram mols of recurring ethylene terephthalate structural units in the polyester, as calculated herein, is equal numerically to mol percentage calculated on the basis of atoms of boron per structural unit of ethylene terephthalate (adjusted to include other glycol dicarboxylate units). For brevity, the values given in the examples are reported as mol percent.

The following examples are cited to illustrate the invention, and are not intended to be limitative. Unless otherwise stated, anhydrous conditions are maintained until after the oxyboron-modified polyester has been melt-spun, the fibers are spun in conventional manner into air of normal humidity and are exposed to moisture in the air after spinning.

Example 1

In a series of experiments for which the results are recorded in Table I, a series of samples of polyethylene terephthalate containing various boron compounds is prepared together with a control sample containing no boron. In each run, 4536 parts of dimethyl terephthalate, 3062 parts of ethylene glycol, 2.04 parts of manganous acetate·4H$_2$O, an 1.36 parts of antimony trioxide are heated with evolution of methanol until no more methanol is evolved, the final temperature being about 230° C. The reaction mixture is then placed in an autoclave together with 1.5 parts of phosphoric acid, 13.6 parts of titanium dioxide, and, in a solution of 350 parts of glycol, the amount of boron compound indicated in the table. The temperature is increased to 275° C. and the pressure reduced to 1 mm. of mercury while the mixture is being agitated by a stirrer operated by means of air pressure which, after one hour, is held constant at 60 p.s.i. The mixture is held at this constant pressure and temperature for a period of 2 to 5 hours while glycol vapor is removed continuously and the mixture becomes more viscous. The rate of rotation of the stirrer decreases as the viscosity of the mixture increases; and when the stirrer speed reaches a value previously calibrated as equivalent to a reaction mass melt viscosity of approximately 2200 poises, the polymer is extruded. The relative viscosity determined for each sample is indicated in the table, together with the mol percentage boron in the polymer as determined by analysis.

TABLE I.—PREPARATION OF POLYETHYLENE TEREPHTHALATE AT CONSTANT MELT VISCOSITY (2,200 POISES AT 275° C.)

| Boron Compound Added | Wt. Percent [1] | Mol. Percent [2] | Rel. Visc. of Polymer | Mol Percent in Polymer [2] |
|---|---|---|---|---|
| (1) None (control) | 0.0 | 0.0 | 23.0 | 0.0 |
| (2) Boric acid | 2.0 | 6.2 | 16.7 | 0.96 |
| (3) Boric acid | 3.0 | 9.3 | 15.8 | |
| (4) Methyl polyborate | 0.9 | 3.1 | 18.0 | 0.56 |
| (5) Methyl polyborate | 1.8 | 6.2 | 16.5 | 0.90 |
| (6) Methyl metaborate | 2.0 | 6.2 | 18.5 | 0.87 |
| (7) Sodium tetraborate decahydrate | 1.5 | 6.2 | 18.0 | 0.78 |
| (8) Boric acid, fused (calculated as [HBO$_2$]$_3$) | 0.9 | 4.0 | 17.3 | |

[1] Based on weight of dimethyl terephthalate.
[2] Based on gram atoms of boron per 100 gram mols of ethylene terephthalate.

Example 2

Polyethylene terephthalate is prepared as in Example 1 using 91 parts of boric acid (2.0 weight percent or 62 mol percent), except that the polymerization is stopped when the melt viscosity reaches 1550 poises (275° C.). The resulting polymer has a relative viscosity of 14.9. A control sample of polyethylene terephthalate in which no boric acid is added, when polymerized under the same conditions to 1550 poises (275° C.), has a relative viscosity of 21.5.

In another experiment, polyethylene terephthalate containing 6.2 mol percent boric acid and a control sample containing no boric acid are polymerized under the same conditions until a melt viscosity of 4500 poises (275° C.) is reached. The polymer containing boric acid exhibits a relative viscosity of 20.1, while the control sample exhibits a relative viscosity of 29.0.

As shown in Table I, when polyethylene terephthalate containing 6.2 mol percent boric acid and a control sample containing no boric acid are polymerized under the same conditions until a melt viscosity of 2200 poises is reached, the polymer containing boric acid exhibits a relative viscosity of 16.7 while the control sample exhibits a relative viscosity of 23.0.

Example 3

Dimethyl terephthalate and ethylene glycol are reacted in the presence of catalysts as in Example 1 with subsequent addition of phosphoric acid, titanium dioxide, and 6.2 mol percent boric acid (91 parts or 2.0 weight percent). A stream of the monomer is fed to a continuous polymerization apparatus wherein the temperature of the liquid is increased and the pressure reduced as glycol is continuously evolved, the temperature in the final vessel being 275° C. and the pressure being 1 mm. of mercury. After equilibrium conditions are attained, the final melt viscosity is 1050 poises (275° C.). The resulting polymer is passed directly to a spinning chamber where it is extruded at 285° C. through a spinneret containing 34 holes, each 0.009 inch in diameter. The spun yarn has a relative viscosity of 13.4. A control sample of polyethylene terephthalate in which no boric acid is added, when polymerized under the same conditions to 1050 poises (275° C.), yields yarn having a relative viscosity of 18.5.

Samples of the yarns, after standing in air, are remelted and extruded from a standard orifice in a melt index apparatus at 275° C. The boron-containing polymer has a melt viscosity value of only 394, although the relative viscosity of the extruded, remelted polymer is still 12.7, relatively unchanged from the initial value. The remelted yarn from the unmodified control polymer has a melt viscosity of 778, and the relative viscosity of the remelted polymer is 17.2.

Part of the polymer initially prepared in each of the two runs is extruded into containers which are immediately closed and blanketed with dry nitrogen while the polymer samples solidify. After standing overnight with careful exclusion of water or water vapor from the polymer samples, they are remelted and spun into filaments. The melt viscosities of the boron-containing polymer and the unmodified polyethylene terephthalate are approximately equivalent, while relative viscosity values approximately corresponding to those given above are again obtained.

Example 4

Polyethylene terephthalate is prepared in an autoclave according to the general procedure of Example 1 using 91 parts of boric acid (2.0 weight percent or 6.2 mol percent). When the melt viscosity reaches 1200 poises (275° C.), the reaction is stopped and the polymer is extruded from the autoclave in a ribbon, quenched in water, and cut into flake. The relative viscosity of the polymer is 13.9, and analysis of the polymer reveals that it contains 1.12 mol percent boron (0.36 weight percent calculated as boric acid). The flake is thoroughly dried, using recirculating warm, dry air.

The dried flake is then remelted in an autoclave by heating the polymer to 275° C. with stirring. The melt viscosity of the remelted flake, as given by the calibrated stirrer speed, is only 400 poises. Full vacuum is then applied and the polymer is then subjected to a second polymerization cycle at 275° C. at 1 mm. of mercury. After 30 minutes, the melt viscosity reaches 1000 poises. The polymer is then passed from the autoclave directly to a spinning chamber where it is extruded at 285° C. through a spinneret containing 34 holes, each 0.009 inch in diameter. The spun yarn is found to have a relative viscosity of 15, and analysis of the yarn reveals that it contains 0.93 mol percent boron (0.30 weight percent, calculated as boric acid).

Example 5

A charge of polyethylene terephthalate is prepared in an autoclave following the general procedure of Example 1, but without adding a boron compound after the ester interchange step. After the melt viscosity reaches 1800 poises (275° C.), as indicated by the rate of rotation of the agitator the polymer is extruded. It is found to have a relative viscosity of 21.8.

The experiment is repeated; except that when the melt viscosity reaches 1800 poises (275° C.), the autoclave is brought to atmospheric pressure and 11.35 parts of boric acid is added (0.25 weight percent or 0.77 mol percent). Agitation is continued for 5 minutes at the same temperature, after which time the melt viscosity is 1800 poises (275° C.) as indicated by the rate of agitation. The polymer is then extruded. The relative viscosity of the polymer is 18.2.

The experiment is repeated again, substituting 8.0 parts of fused boric acid (0.18 weight percent or 0.77 mol percent) for the boric acid previously used. The melt viscosity of the modified polymer is 1800 poises (275° C.) and the relative viscosity of the extruded polymer is 18.0.

Example 6

A charge of polyethylene terephthalate is prepared in an autoclave in accordance with the general procedure described in Example 1, but without adding a boron compound after the ester interchange step. After the melt viscosity reaches 3300 poises (275° C.), as indicated by the calibrated rotation rate of the stirrer in the autoclave, the reaction is stopped by introducing dry nitrogen to bring the vessel to atmospheric pressure. Stirring is continued for 5 additional minutes, during which time the melt viscosity remains constant. The polymer is then passed from the autoclave directly to a spinning chamber where it is extruded at 285° C. through a spinneret containing 34 holes, each 0.009 inch in diameter. The spun yarn has a relative viscosity of 26.0. A sample of the yarn, after standing in air for 24 hours, is remelted and extruded from a standard orifice in a melt index apparatus at 275° C. The sample has a melt viscosity of 2110 poises and the extruded polymer has a relative viscosity of 24.2.

The experiment is repeated; except that when the autoclave is brought to atmospheric pressure 28.5 parts of benzeneboronic acid (1 mol percent) is immediately added. Stirring is continued for 5 minutes at the same temperature, during which time the melt viscosity remains substantially constant (275° C.) is indicated by the rate of agitation. The polymer is passed from the autoclave directly to a spinning chamber where it is extruded into yarn as described above. The relative viscosity of the yarn is 17.1. A sample of the yarn, after standing in air for 24 hours, is remelted and extruded from a standard orifice in a melt index apparatus at 275° C. The melt viscosity is only 620 poises. The relative viscosity of the extruded polymer is 14.8.

Additional experiments are performed, substituting various boron-containing compounds for the benzeneboronic acid. The melt viscosity values and relative viscosity values obtained with the various boron-containing samples of polyethylene terephthalate are substantially equivalent in each instance to the values obtained from the corresponding samples of polyethylene terephthalate containing benzeneboronic acid. The additives employed, together with the number of parts taken in each instance, are listed below. In each case, the quantity employed corresponds to 1 mol percent of the boron-containing compound.

|  | Parts |
|---|---|
| Sodium benzeneboronate | 38.8 |
| Phenyldiethoxyborane | 41.6 |
| p-Carbethoxybenzeneboronic acid | 45.4 |
| Phenyl-p-carbethoxyphenylethoxyborane | 66.0 |
| 4-(2-hydroxyethoxy)phenyl - bis-(2-hydroxyethoxy) borane | 59.4 |

Example 7

A reaction mixture comprising 3857 parts of dimethyl terephthalate, 680 parts of dimethyl isophthalate, 3062 parts of ethylene glycol, 2.04 parts of manganous

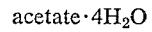

and 1.36 parts of antimony trioxide is heated with evolution of methanol until no more methanol is evolved, the final temperature being about 230° C. The reaction mixture is then placed in an autoclave together with 1.5 parts of phosphoric acid, 13.6 parts of titanium dioxide, and a solution of 90.7 parts of boric acid (2.0 weight percent or 6.2 mol percent) in 350 parts of glycol. The mixture is then polymerized at 275° C. and 1 mm. of mercury in accordance with the procedure of Example 1. When the stirrer speed reaches a value previously calibrated as equivalent to a reaction mass melt viscosity of 1900 poises, the polymer is extruded. The product, polyethylene terephthalate/isophthalate (85/15), is found to have a relative viscosity of 17.3. When the experiment is repeated, omitting the boric acid from the ingredients, the relative viscoity of the unmodified polyethylene terephthalate/isoisophthalate (85/15) is found to be 23.0 when the melt viscosity is 1900.

In a similar experiment, 150 parts of sodium 3,5-dicarbomethoxybenzenesulfonate and 4536 parts of dimethyl terephthalate are reacted with ethylene glycol, manganous acetate, antimony trioxide, phosphoric acid, titanium dioxide, and boric acid in the amounts specified above. The reaction is carried out in the same manner, and the polymer is extruded at a melt viscosity of 3350 (275° C.). The product, polyethylene terephthalate/5-(sodium sulfo) isophthalate (98/2), is found to have a relative viscosity of 15.7. When the experiment is repeated, omitting the boric acid from the ingredients, the relative viscosity of the unmodified polymer is found to be 18.9 when the melt viscosity is 3350.

Example 8

Polyethylene terephthalate containing 3.0 weight percent boric acid (9.3 mol percent), prepared as described in Example 1 and exhibiting a melt viscosity of 2200 poises at 275° C., is extruded at 288° C. through a spinneret containing 250 holes, each 0.009 inch in diameter. The polymer in the spun yarn exhibits a relative viscosity of 14.8 and contains 1.09 mol percent boron. The yarn is then drawn 3.26× through a water bath maintained at 100° C., following which it is heated for 6 minutes in a condition free to relax in an oven maintained at 100° C. The drawn and relaxed yarn has a denier per filament of 1.5, a tenacity of 3.7 g.p.d., an elongation at break of 20%, a load-bearing capacity at 7% elongation of 18 g.p.d., and a boil-off shrinkage of 2%. The yarn is cut to 1.5-inch lengths and processed to fabric, both as 100% polyethylene terephthalate fabric and as a blend of 65% polyethylene terephthalate with 35% of cotton. After conventional finishing treatments the fabrics are found to be relatively free from pills after normal use in garments.

A control sample of polyethylene terephthalate containing no boric acid but otherwise prepared as above and exhibiting a melt viscosity at 2200 poises at 275° C. is extruded into filaments under the same conditions. The polymer in the spun yarn exhibits a relative viscosity of 22.0. After the yarn is drawn under the conditions described above, it is converted to a product having 2% boil-off shrinkage, which in this instance requires relaxation at 120° C. The drawn and relaxed yarn has a denier per filament of 1.5, a tenacity of 3.9 g.p.d., an elongation at break of 22%, and a load-bearing capacity at 7% elongation of 1.3 g.p.d. When the yarn is then cut to 1.5-inch lengths and processed into fabric, it is found to be generally similar in its appearance and most of its properties to the fabrics containing boric acid. However, the control fabrics exhibit severe pilling after a short period of use in garments under normal conditions.

In addition to enhanced melt viscosity, polyethylene terephthalate containing a soluble boron compound also exhibits other surprising properties. For instance, the shrinkage behavior of fibers prepared from the polymer is profoundly affected. As an example, filaments of conventional polyethylene terephthalate pin-drawn after preheating at 90° C. under sub-drawing tension exhibit a boiling off shrinkage of 10–11% and the product then exhibits a further shrinkage, in fabric form, of 6% when heated in air at 200° C. Filaments prepared from polyethylene terephthalate containing boric acid, when drawn under the same conditions, exhibit approximately the same boil-off shrinkage but the resulting product is then essentially stable to heat, the additional shrinkage in fabric form at 200° C. being only 1.5%.

A somewhat different effect is achieved by changing the method of drawing to that used in Example 5, i.e., drawing the yarn through a water bath maintained at 100° C. The boil-off shrinkage of borate-modified yarn drawn in this manner is found to be only 4½ to 5% as contrasted with a boil-off shrinkage of 8% in the case of unmodified yarn. In this case, the subsequent shrinkages of the two types of yarn when heated at higher temperature are approximately the same. However, the effect is important in preparing polyethylene terephthalate staple yarns suitable for blending with cotton. The drawn borate-modified yarn can be relaxed at 100° C. to produce staple fibers having a boil-off shrinkage of 2% and a load bearing capacity at 7% elongation of 1.8 grams per denier. To produce staple yarn having 2% boil-off shrinkage from unmodified drawn polyethylene terephthalate yarn requires relaxation at 120° C., and the product then has a load-bearing capacity at 7% elongation of only 1.3 grams per denier. A high load-bearing capacity at 7% elongation is desired in polyethylene terephthalate fibers intended for use as stress-bearing components in blends with cotton, which itself has an average break elongation of 7%.

It has also been observed that borate-modified polyester yarns exhibit consistently higher spontaneous extension in length upon heating than do unmodified polyethylene terephthalate yarns relaxed to the same extent in accordance with the methods described by Kitson and Reese in Belgium Patent No. 566,145. Such products are prepared, for example, by drawing the spun yarns in the presence of water followed by shrinking the yarn at least 20% in a hot medium for a time insufficient to permit a substantial increase in crystallinity. At the same level of spontaneous extensibility, yarns made from borate-containing polyethylene terephthalate have higher tenacity than yarns made under corresponding conditions from unmodified polyethylene terephthalate.

Since many different embodiments of the invention may be made without departing from the spirit and scope thereof, it is to be understood that the invention is not limited by the specific illustrations except to the extent defined in the following claims.

I claim:
1. An improvement in the process of melt spinning ethylene terephthalate polyester to produce textile fibers of sufficiently low molecular weight to substantially decrease pilling in fabrics containing the fibers, which process includes melt-polymerization of ethylene terephthalate in the presence of a condensation catalyst to a final temperature of about 250° C. to 300° C. and a final pressure of less than 10 mm. of mercury to form an anhydrous melt; wherein the improvement comprises conducting said melt-polymerization in the presence of a conventional boron-free condensation catalyst and adding an oxyboron compound prior to melt spinning to form an anhydrous melt having a melt viscosity of about 1000 to 6000 poises and a boron content of 0.5 to 2 gram atoms of boron per 100 gram mols of ethylene terephthalate recurring structural units in the polyester; said oxyboron compound being selected from the group consisting of sodium borate, methyl metaborate, benzeneboronic acid, phenyldiethoxyborane, p-carbethoxybenzeneboronic acid, phenyl - p - carbethoxyphenylethoxyborane, and 4(2-hydroxyethoxy)phenyl - bis - (2-hydroxyethoxy)borane; maintaining said polyester anhydrous and melt-spinning it to form fibers; and finally exposing the spun fibers to moisture.

2. The process as defined in claim 1 wherein said oxyboron compound is added to the melt after completion of said melt-polymerization and is mixed with the melt immediately prior to melt spinning.

3. The process as defined in claim 1 wherein said oxyboron compound is added at the start of said melt-polymerization in the proportion of about 3 to about 20 gram atoms of boron in the oxyboron compound per 100 gram mols of ethylene terephthalate recurring structural units in the polyester and the melt-polymerization is conducted to evolve the excess boron as volatile boron compounds.

4. The process as defined in claim 1 wherein said oxyboron compound is sodium borate.

5. The process as defined in claim 1 wherein said oxyboron compound is methyl metaborate.

6. The process as defined in claim 1 wherein said oxyboron compound is benzeneboronic acid.

7. The process as defined in claim 1 wherein said oxyboron compound is phenyldiethoxyborane.

8. The process as defined in claim 1 wherein said oxyboron compound is p-carbethoxybenzeneboronic acid.

9. The process as defined in claim 1 wherein said oxyboron compound is phenyl-p-carbethoxyphenylethoxyborane.

10. The process as defined in claim 4 wherein said oxyboron compound is 4(2-hydroxyethoxy)phenyl-bis-(2-hydroxyethoxy)borane.

References Cited
UNITED STATES PATENTS

| | | | |
|---|---|---|---|
| 1,969,761 | 8/1934 | Rosenblum | 260—75 |
| 2,437,232 | 3/1948 | Rothrock et al. | 260—75 |
| 3,214,400 | 1/1956 | Silver | 260—75 |
| 1,970,510 | 11/1934 | Ellis | 260—75 |

WILLIAM H. SHORT, *Primary Examiner.*

R. T. LYON, *Assistant Examiner.*

UNITED STATES PATENT OFFICE
CERTIFICATE OF CORRECTION

Patent No. 3,391,123                                                  July 2, 1968

Harvey Steadly

It is certified that error appears in the above identified patent and that said Letters Patent are hereby corrected as shown below:

Column 14, line 52, the claim reference numeral "4" should read -- 1 --.

Signed and sealed this 18th day of November 1969.

(SEAL)
Attest:

Edward M. Fletcher, Jr.                          WILLIAM E. SCHUYLER, JR.
Attesting Officer                                          Commissioner of Patents